3,098,123
AUTOMATIC SIGNALLING APPARATUS
Charles R. P. Stonor, Chowns Mead, Tylers Green, near Haywards Heath, England, assignor to Sound Diffusion (Sales) Limited, Portslade, England
Filed Dec. 4, 1959, Ser. No. 857,335
8 Claims. (Cl. 179—2)

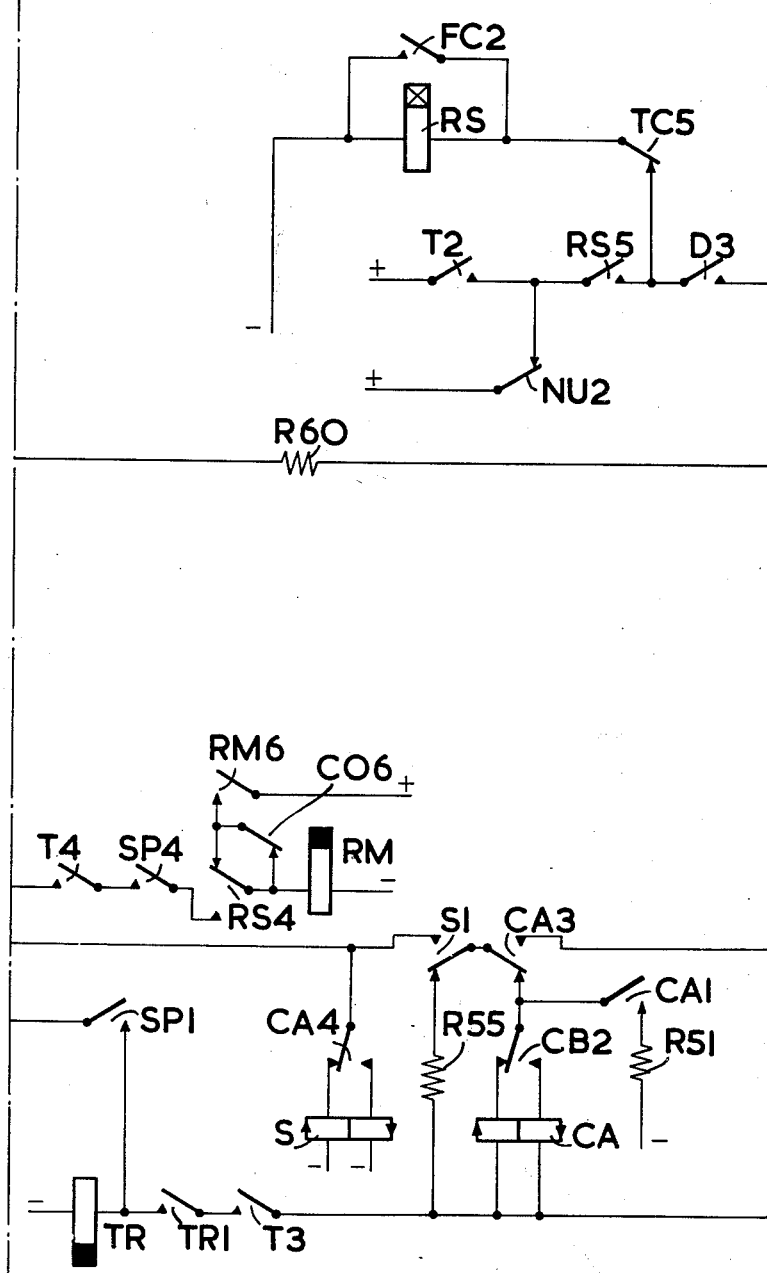

This invention relates to automatic signalling apparatus and in particular to supervisory equipment for unattended electrical sub-stations, control rooms, boiler houses, gas and water undertakings and like installations.

It is desirable in many branches of industry to ascertain remotely the state of equipment in unattended locations such as electrical sub-stations and the like. This has hitherto been achieved by the use of various techniques which commonly involve the installation of special cabling between the supervisory station and the unattended point. It is the object of the present invention to provide a method of obtaining the required information by equipment operating over and in conjunction with the normal national telephone system.

According to the invention, there is provided apparatus for supervisory purposes comprising at a first location a record medium on which are impressed verbal statements or other signals which are descriptive of the various possible states of apparatus which have been selected for supervision or of measurable quantities, a reproducing device which senses in turn all the recorded signals, means to select from the reproduced signals and transmit to a second location those signals which describe the supervised equipment or quantities at the time of transmission and for preventing the transmission of all inapplicable descriptive signals sensed by the reproducing device.

Since the equipment operates over the national telephone network, all information can be given in verbal form. No special pilot cables are required and a particular advantage is that all information regarding the state of equipment at the remote location may be obtained from any telephone on the national network.

Figure 1:
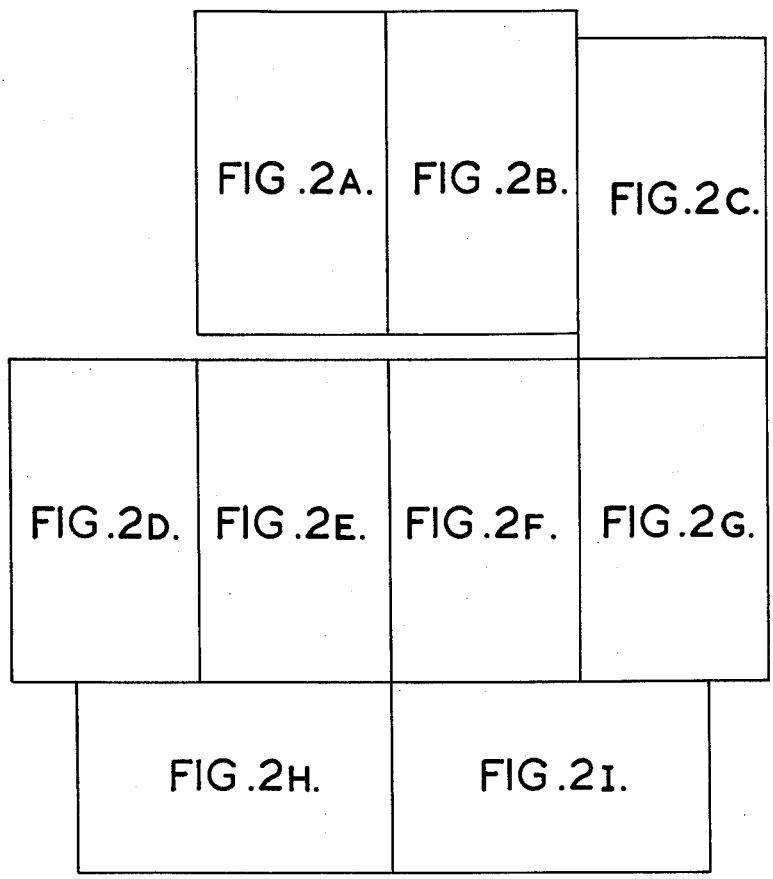

An embodiment of the invention will now be described with reference to the accompanying drawings of which:

FIG. 1 is a block schematic diagram showing how the various sections of FIG. 2 are related to each other, and FIG. 2 is a circuit diagram in nine sections (2A to 2I) of the complete system.

In this embodiment, the system is applied to an electricity undertaking wherein an unattended substation is monitored from a central station. It is to be understood, however, that the equipment may be used with many other types of plant such as gas and water undertakings.

In this present embodiment, the equipment details verbally the position of all circuit breakers at the sub-station, this information being pre-recorded on a disc forming part of an announcement unit at the sub-station.

Before proceeding further with the description, the sequence of information recorded on the disc will be given in detail together with an outline of the corresponding operations of the equipment.

SEQUENCE OF INFORMATION RECORDED ON DISC

(1) The exchange number of the control room. This is recorded as a series of 8 kilocycles tone bursts of the correct mark/space ratio with correct interdigital pauses. Amplifier, filter and rectifier circuits convert these signals to enable them to operate dialling circuits. A delay period follows in order to allow the call to be put through at the control room.

(2) The identity of the substation in verbal form.

(3) An 8 kilocycles tone burst which steps a uniselector switch. This first step caters for additional selective control equipment, should it be fitted. This signal is followed on the disc by a second tone burst which steps a selector switch to test the condition of the first circuit breaker, whether "open" or "closed."

(4) The announcement "Circuit breaker No. 1 is open." The testing circuits check to see if this condition applies. If it does, the announcement is passed to line, if not, it is suppressed.

(5) An 8 kilocycles signal which steps the uniselector switch to test the second condition of the first circuit breaker.

(6) The announcement "Circuit breaker No. 1 is closed." The testing circuits in the equipment check to see if this condition applies. If it does, the announcement is passed to line; if not, it is suppressed. Since conditions 4 and 6 cannot simultaneously apply to the same circuit breaker, one announcement of the pair is arranged to be suppressed.

(7) This series is repeated for all circuit breakers in sequence. The selector switch thus progressively tests each breaker and a composite message detailing the present breaker position is given over the Post Office line.

(8) An 8 kilocycles tone burst to step the selector.

(9) The announcement "That was a false message, please ignore." If the "synchronism lost" circuit had operated, all announcements subsequent to this condition arising in the cycle would have been transmitted, for example, "Circuit breaker 7 open," "Circuit breaker 7 closed," thus giving a contradictory and obviously incorrect message. Otherwise, of course, this announcement would be suppressed.

(10) An 8 kilocycles tone burst to step the selector switch.

(11) The announcement "Send acknowledgement signal now."

(12) An 8 kilocycles tone burst to step the selector switch.

(13) A delay period to allow for the receipt of the tone that acts as an acknowledgement signal. The telephone line connections are altered during this delay period and the input of an amplifier is connected to line. At the end of the delay the amplifier is switched to transmit outgoing signals. If the acknowledgement signal is given correctly, all announcements following the request for acknowledgment are suppressed. Should the signal not be received, the announcement "Send repeat message signal now" is given.

(14) An 8 kilocycles tone burst to step the selector switch.

(15) A delay period to allow for the receipt of the tone signal that acts as a "repeat message" signal. The input of the amplifier is connected on to the telephone line during this period.

(16) A number of 8 kilocycles tone bursts to step the selector switch.

(17) A 5 second 8 kilocycles tone burst which acts as an "End of Cycle" signal.

A detailed description of the working of the apparatus shown in the accompanying drawings will now be given under various headings.

*Autodialler*

Transistor Q1 (FIG. 2A) acts as an amplifier for the 8 kilocycles tone signals on the disc and also for the audio announcements. The pick-up PU for the disc is connected to the base of the transistor by resistance capacity coupling R2, C1. Resistors R1 and R3 are biassing resistors for transistor Q1.

Figure 2A:
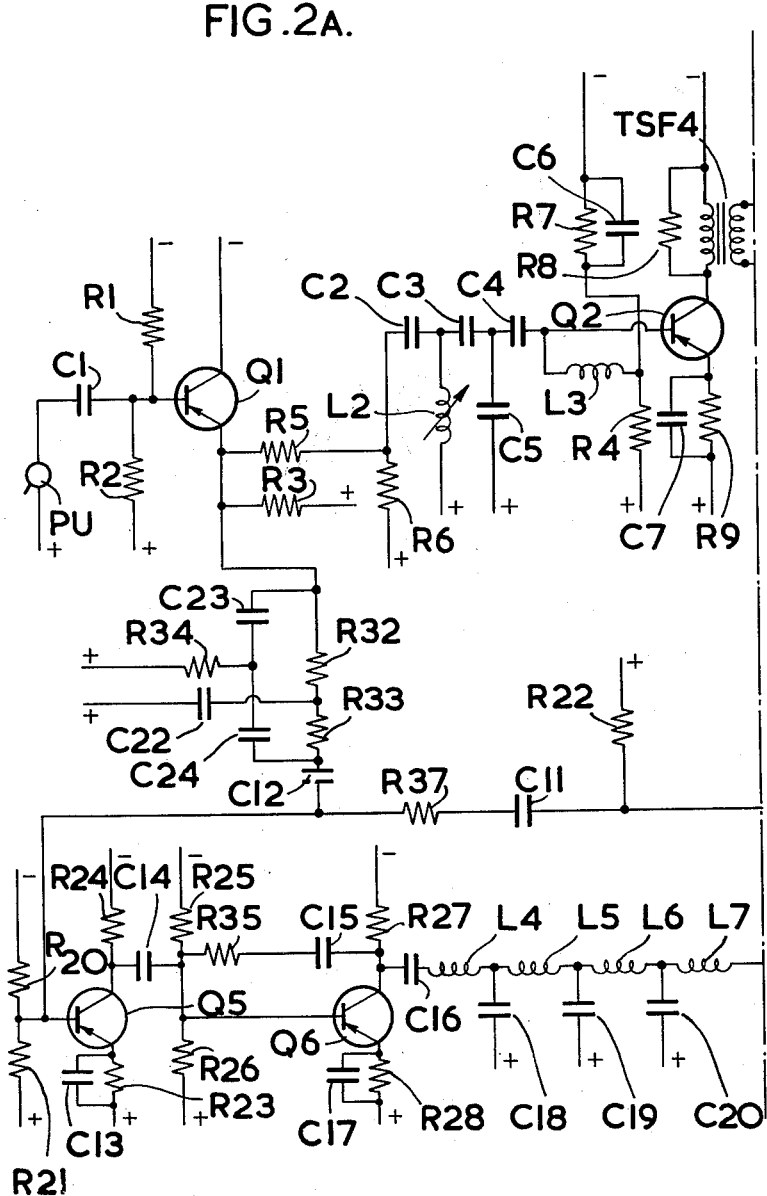
Figure 2B:
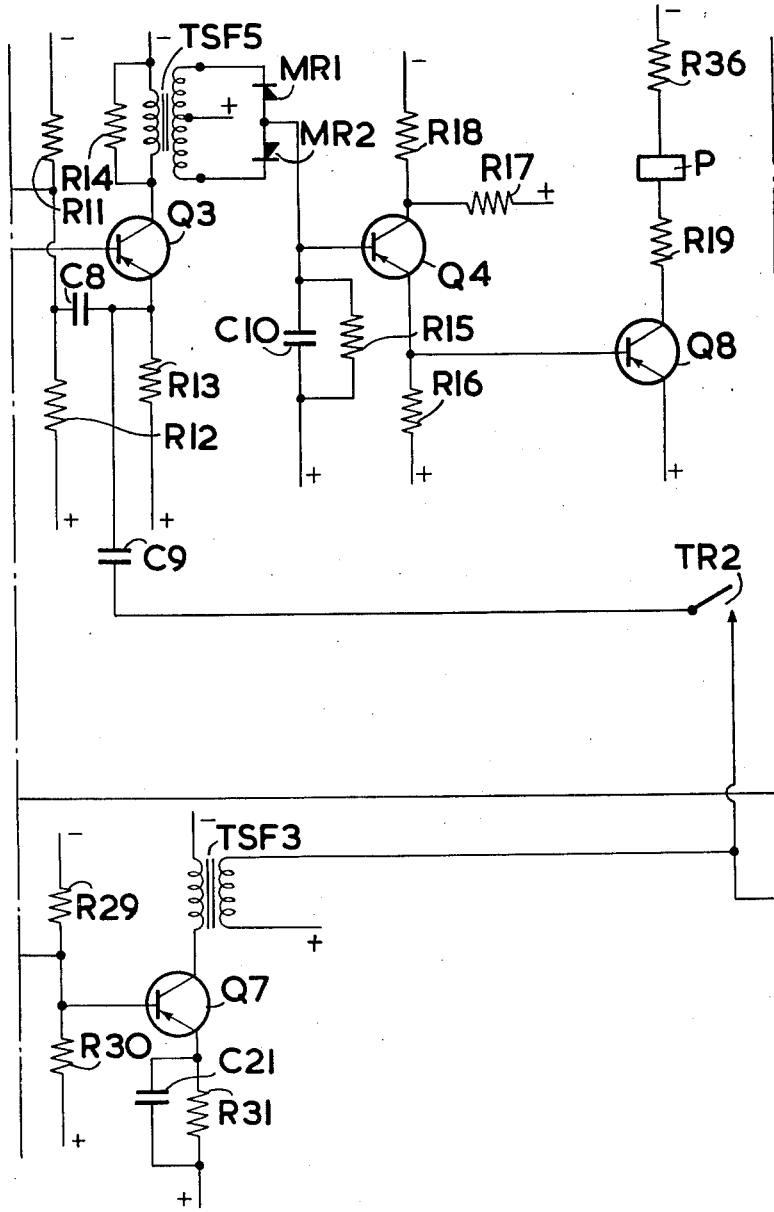

The tone signals are fed via resistor R5 and condenser C2 through the 8 kilocycles bandpass L2, L3, C3, C4, C5 to the transistor amplifier stage Q2, and thence via a transformer TSF4 to a third amplifier stage Q3 (FIG. 2B). Diodes MR1 and MR2 rectify the 8 kilocycles signal and transistors Q4 and Q8 act as D.C. amplifiers therefor. Relay P thus operates on any 8 kilocycles tone signal on the disc whose duration exceeds the operating time of the relay P. This relay is used for dialling, stepping and for control purposes.

Figure 2C:
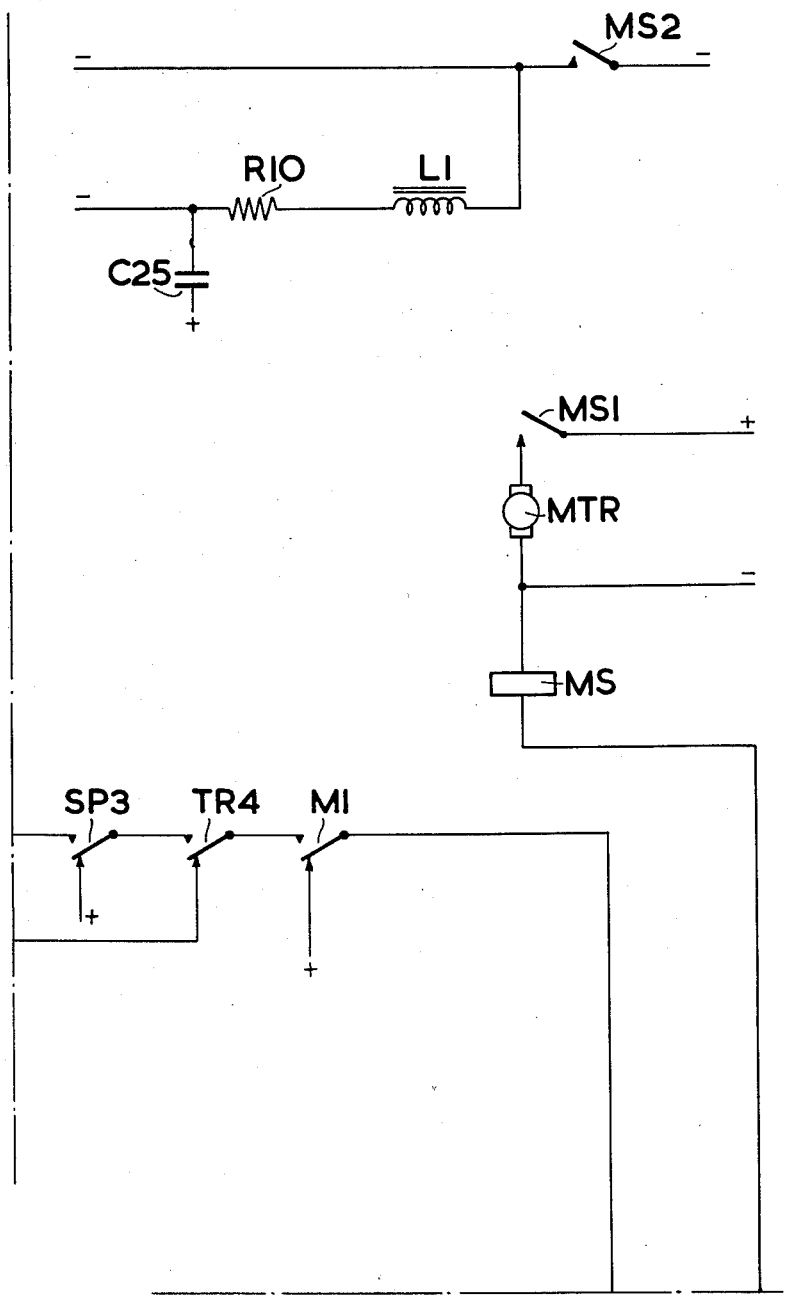

The bridged T filter C22, C23, C34, R32, R33, R34 (FIG. 2A) acts as an 8 kilocycles band stop filter. Transistors Q5, Q6 and Q7 (FIG. 2B) act as an audio-frequency amplifier passing the audio-frequency announcements out to line over contacts TR4 and M1 (FIG. 2C). The components L4, L5, L6 and L7, C18, C19, C20 (FIG. 2A) act as a low-pass filter to suppress any signals above 3 kilocycles.

When the equipment is expecting a "repeat message" or "acknowledgement" signal, relays M (FIG. 2D), SP (FIG. 2H), and TR (FIG. 2E) are operated. As a result, the Post Office line circuit is connected on to the base of Q5 (FIG. 2A). Q5, Q6, Q7 (FIG. 2B) and Q3 act as an audio-frequency amplifier and the signal from line is rectified by MR1 and MR2. As a result, relay P will operate. Provided that certain timing considerations are fulfilled, operation of the relay under these circumstances causes the equipment to shut down or to repeat the message.

The announcement unit is brought into operation by closure of contact BC3 (FIG. 2F) which energizes relay MS to start the disc-driving motor MTR by contact MS1. Contact MS2 connects to D.C. supply to the amplifier.

Main Chassis

GENERAL

Under normal conditions all relays will be released and selector CS (FIGS. 2D and 2H) will be standing on position 1. This selector has four levels CS1 to CS4. The auxiliary contacts AX1 and AX2 (FIG. 2D) on the circuit breakers will be in positions which depend upon the state of the breakers.

It will be assumed that the equipment is to be used in conjunction with twenty circuit breakers in which case the auxiliary contacts AX1 on breaker No. 1 are connected to the strapped positions 3 and 4 on level CS1. Contact AX2 of breaker No. 2 is connected to positions 5 and 6, this arrangement being continued around the bank with the auxiliary contacts on breaker No. 20 being connected to the strapped positions 41 and 42.

It is to be understood that the circuit may be readily adapted for use with a smaller number of circuit breakers than twenty.

With twenty breakers connected, position 1 on the selector is connected to negative via the limiting resistor R38 and position 2 is left blank. This position is to allow for the inclusion of additional selective control facilities on certain models.

"TRANSIENT START"

The equipment may be set in operation by the change-over of any of the auxiliary circuit breaker contacts AX1, AX2, . . .

Associated with each of these contacts is a condenser CX1, CX2, . . . which may be changed positively directly, or negatively through a limiting resistor R39, depending upon the position of the particular contact. The voltages applied to the condensers are also fed to the contacts on level CS1. These contacts are strapped in pairs to correspond with the "open" and "closed" announcements. The voltage polarities are referred to the centre tap of the battery to which the return of transformer TSF1 is taken.

As a circuit breaker changes state, its auxiliary contact will change over and the voltage applied to the associated condenser will be reversed by the contact. As a result, a positive- or negative-going pulse is applied across the primary of transformer TSF1.

Rectifier MR3 or MR4 passes the negative pulse appearing across one half of the centre-tapped secondary of TSF1 and drives Q9 into conduction. This is D.C. coupled to Q10 and the changeover of the circuit breaker contact thus results in a momentary pulse being given by relay TS.

It must be noted that the diodes MR3 and MR4 in conjunction with the centre-tapped transformer TSF1 make the polarity of the applied pulse unimportant. One diode will conduct if the primary pulse is negative-going whilst the other will conduct on a positive-going primary pulse.

As a result, relay TS pulses and, in addition, positive or negative potentials are applied to the contacts of CS1 depending upon the present position of the auxiliary contacts.

NORMAL CALL—OUTGOING

The operation of the equipment will first be considered on an outgoing call from the local unattended substation.

Relay TS pulses as a circuit breaker changes state which results in relay FS (FIG. 2F) operating over contact TS1, rectifier MR5 and contact FC5. Relay FS is held operated by the positive connected via contacts PFS1, BC3, FS1 and FC5. Contact FS2 prepares an operating circuit for relay PFS whilst FS3 (FIG. 2I) causes relay BC to operate over contact CO7 and/or T6.

Contact BC1 (FIG. 2H) disconnects the homing circuit of CS and connects it over contact D4 (FIG. 2D) to CS1. Contact BC2 (FIG. 2I) provides a holding circuit for relay BC and contact BC6 (FIG. 2G) operates relay RCO (FIG. 2I) over contacts CO1 and RR3. Contact BC3 (FIG. 2F) operates relay PFS over contact FS2 and starts the announcement unit by energizing relay MS (FIG. 2C). Relay PR (FIG. 2I) is operated over contacts CA2, BC7, TC4, CO5, P3 and RR8 (FIG. 2G) and resistor R41 (FIG. 2I).

Figure 2D:
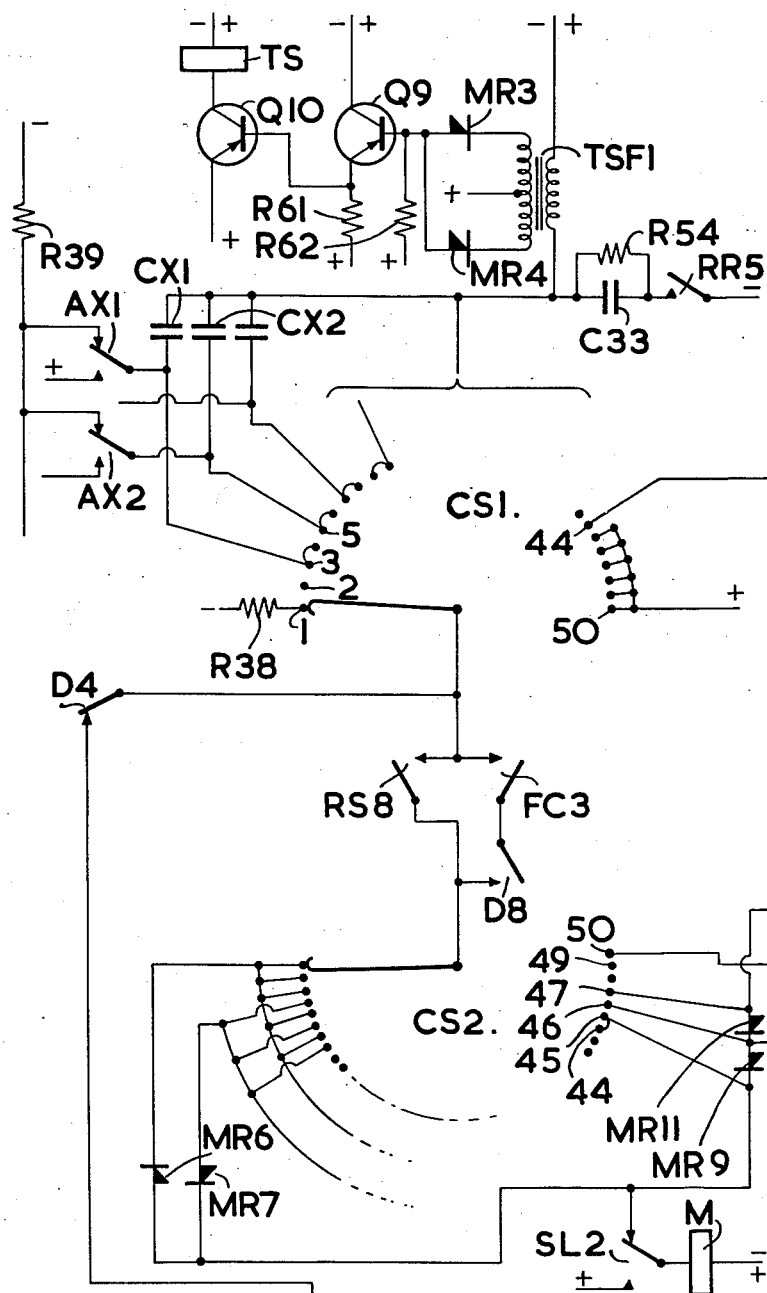

Relay FS (FIG. 2F) is released as contact PFS1 opens and contact PFS2 provides a holding circuit for relay PFS. An alternative holding circuit for relay PFS on the subsequent operation of contact RS3 or RM4 is prepared by contact PFS3. Positive is thus prevented from being applied to contact 44 on CS1 (FIG. 2D). Relay PR (FIG. 2I) operates and at contact PR1 completes the circuit to engage the exchange apparatus whilst contact RCO1 short-circuits the secondary of the line-matching transformer TSF2 thus reducing the internal series resistance of the equipment substantially to zero for dialling. A spark-quench circuit across contact PR1 is provided by condenser C29 and resistor R40 as contact RCO2 closes.

After a pause to allow the exchange equipment to be engaged, the dialling train commences. Relay P (FIG. 2B) pulses under the control of the recorded code. As contact P2 (FIG. 2I) changes over on the first pulse, relay T operates from positive over contacts TR3, CO4 and P2. The dialling code is passed out to line as relay PR is pulsed in sympathy with relay P by contact P3 (FIG. 2G). Contact PR1 (FIG. 2I) repeats the dialling code to the exchange equipment. Relay D (FIG. 2G) operated as contact T5 changed over.

The negative voltage supplies for this winding of PR and for relay P (FIG. 2B) are identical and thus any changes in pulse ratio due to falling battery voltage have been arranged to cancel out by careful choice of relay characteristics and by adjustment of resistors R41 and R42 (FIG. 2I).

Relay T is unable to release during dialling due to the release delay provided by the network comprising capacitor C30 and resistors R43 and R44.

Figure 2F:
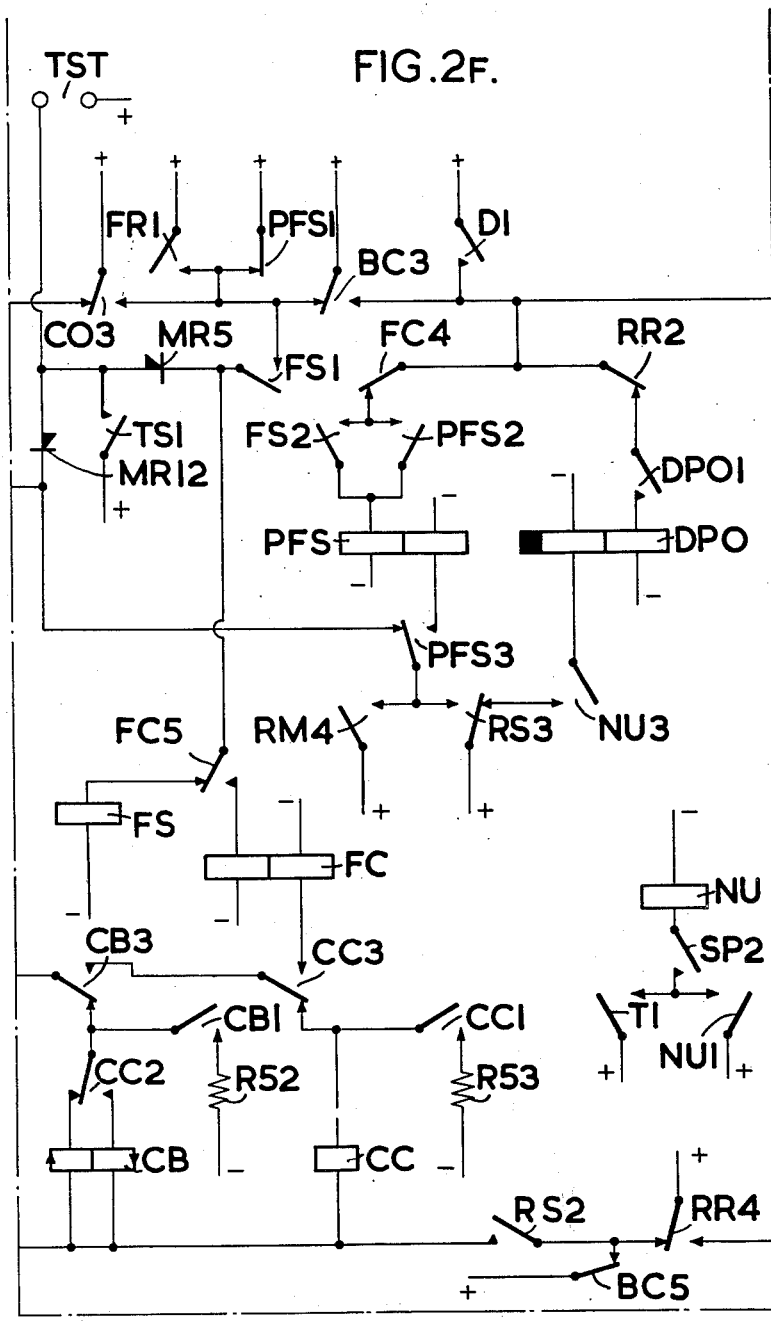
Figure 2G:
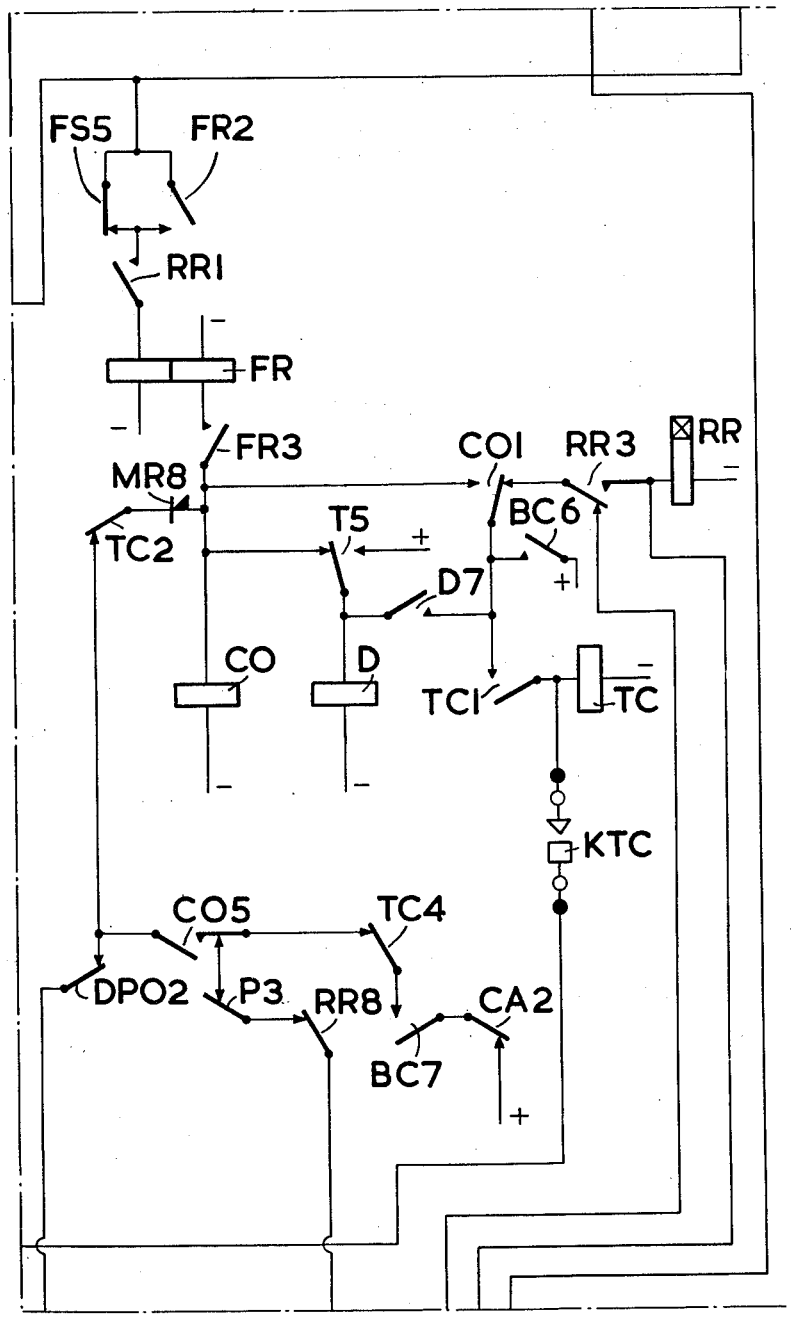

An alternative supply for the relay MS (FIG. 2C) is provided by contact D1 (FIG. 2F) whilst relay RS (FIG. 2E) is operated via contacts TC5, D3 and CO3 (FIG. 2F). Relay D (FIG. 2G) is held over contacts BC6 and D7. Relay PFS (FIG. 2F) holds over its second winding as contact RS3 closes and contact RS5 (FIG. 2E) holds relay RS over contacts TC5, RS5 and NU2. Contact RS8 (FIG. 2D) completes the circuit to operate relay M over contacts CS1 (position 1), rectifier MR6 and contact SL2.

Contact M1 (FIG. 2C) connects the primary of the Post Office line isolating transformer TSF2 (FIG. 2I) to the announcement unit amplifier output over contact TR4 (FIG. 2C). The secondary of the transformer is, however, short-circuited by contact RCO1.

At the end of the dialling train, relay T (FIG. 2I) will be able to release after the 5 second delay and by its contact T5 (FIG. 2G) will operate relay CO. Relay PR (FIG. 2I) will be held operated over contacts BC6, D7, T5, rectifier MR8, and contacts TC2, DPO2 and CA5. Contact T6 (FIG. 2I) falls back to provide an alternative holding circuit for relay BC. Relay RCO is released by contact CO1 (FIG. 2G) and by opening contact RCO1 (FIG. 2I) removes the short-circuit across the secondary of the line transformer TSF2. An alternative holding circuit for relay PR (FIG. 2I) is also provided over contacts CO5 (FIG. 2G), TC4, BC7 and CA2.

The operating circuit for relay RS (FIG. 2E) is broken at contact CO3 (FIG. 2F) but the relay continues to hold over contact NU2 (FIG. 2E). A circuit is now provided over contact CO3 to hold relay FS (FIG. 2F) should it pulse due to a "transient start" occurring due to a second circuit breaker changing state whilst the equipment is in operation. Contact CO4 (FIG. 2I) brings the selector stepping magnet CS (FIG. 2H) under the control of contact P1 over contacts TR3 (FIG. 2I), CO4, D5 (FIG. 2H) and BC4. Contact CO5 (FIG. 2G) disconnects one winding of relay PR (FIG. 2I) and provides an alternative holding circuit over the second winding, whilst contact CO7 opens to leave relay BC holding under the control of contact T6.

The announcement identifying the substation is now given which is passed out to line over contacts TR4 and M1 (FIG. 2C). The announcement is followed by the words "The position of circuit breakers at '. . . substation' is as follows."

Immediately following this announcement, relay P (FIG. 2B) pulses twice from two 8 kilocycles tone bursts on the disc. Contact P1 (FIG. 2H) therefore pulses twice and steps CS on two positions so that it stands on contact 3. A spark-quench circuit R45, C31 is connected across selector coil CS.

The duration of the pulses used to step CS is either 150 milliseconds or 50 milliseconds in order to allow the equipment to check that the selector and the record are in synchronism. Relays SL, HS and SO provide this facility and their operation will be examined later. With CO operated, the operating delay of relay T (FIG. 2I) is 2.5 seconds due to the series resistor R46 and the shunt condenser C30. This relay is thus unable to operate as relay P (FIG. 2B) steps the selector. The condenser C30 is discharged over contact CO2 (FIG. 2I) and resistor R47 as contact P2 falls back.

The potential on contact 3 of CS1 (FIG. 2D) will depend upon the position of the circuit breaker auxiliary contacts. If the circuit breaker is open the potential will be negative; if closed, positive. These potentials are referred to the centre tap on the battery to which relay M is connected.

If the circuit breaker is open, relay M will operate from the negative extended over contact 3 of CS1, RS8, contact 3 of CS2, rectifier MR6 and contact SL2. As a result, contact M1 (FIG. 2C) will connect the output of the amplifier to line and the announcement "Circuit breaker No. 1 is open" will be heard.

If the circuit breaker is closed, relay M (FIG. 2D) will be unable to operate as rectifier MR6 is held in the non-conducting direction by the positive potential on CS1, contact 3. As a result, the output of the amplifier will remain disconnected at contact M1 (FIG. 2C) and the announcement will be suppressed.

At the end of this announcement relay P (FIG. 2B) pulses again from an 8 kilocycles tone burst on the disc. Contact P1 (FIG. 2H) therefore steps CS so that it stands on contact 4.

Contacts 3 and 4 are strapped together on bank CS1 (FIG. 2D). On bank CS2 these contacts are taken to relay M through the oppositely connected diodes MR6 and MR7. The potential from the auxiliary contacts AX1 on circuit breaker No. 1 is applied to both contacts 3 and 4 at CS1 but, due to the presence of these diodes, relay M will only operate on one of the two positions. As a result, one message of the pair will be suppressed and one passed for transmission.

At the conclusion of the second announcement, relay P (FIG. 2B) pulses from an 8 kilocycles tone burst. The selector thus steps to position 5 and tests the condition of circuit breaker No. 2. This sequence is continued until all twenty circuit breakers have been tested and the appropriate announcements thus given. The second announcement for breaker 20 occurs with CS standing on position 42.

As has been mentioned earlier, the duration of pulses used to step CS over the circuit breaker announcement positions is either 50 milliseconds or 150 milliseconds. All pulses after and including that used to step CS from position 42 are 150 milliseconds long. The pulse used to step CS from position 50 to position 1 serves as an "End of Cycle" tone and is 5 seconds long. Its purpose is examined later.

The pulse durations are recorded on the disc in such a sequence that the relays HS (FIG. 2H), SO and SL in conjunction with bank CS3 can provide an indication should the selector and record lose synchronism.

Relay HS is strapped to a number of contacts on CS3 between positions 1 and 42. Relay SL is strapped over contact SO2 to the remainder of the bank contacts between these limits.

The sequence of 50 milliseconds and 150 milliseconds pulses given by contact P1 is such that relay HS will always expect to receive 150 milliseconds pulses, whilst contact SO2 expects 50 milliseconds pulses. If synchronism is lost this sequence will be broken.

Provided that synchronism is maintained, relay SL will not operate at any stage. Relay SO is slow to operate due in part to the presence of resistor R48 and requires an operating pulse from contact P1 of approximately 80 milliseconds duration. On 50 milliseconds pulses from contact P1, relay SO will, therefore, be unable to operate.

Relay HS will operate on either of the pulse durations. Contact HS1 closes to lock the relay over its second winding. If relay SO operates due to the 150 milliseconds pulse, thus indicating that synchronism is maintained, contact SO3 will break the holding winding for relay HS and, due to the difference in release times between relays HS and SO, HS will fall out as contact P1 opens.

SYNCHRONISM LOST. WIPER CONTACT 43 OF CS

Should synchronism be lost, 50 milliseconds pulses will be applied to relay HS and 150 milliseconds pulses to contact SO2. If the short pulse is applied to HS it will lock over its second winding as SO is unable to operate. As a result, relay SL will operate over contacts TR3 (FIG. 2I), CO4, P1 (FIG. 2H), HS2 and SO2 as contact P1 falls back. Contact SL1 closes and the relay SL locks over its second winding to contact D2.

If a 150 milliseconds pulse is given to a bank contact connected to SO2, relay SL will operate over the bank as contact SO2 closes. Relays HS and SO play no part in the circuit operation after SL has locked over contact D2.

The sequence of strappings is such that relay SL will operate within a few steps of CS if the equipment loses synchronism to the extent that CS is either an odd or even number of steps behind or ahead of the announcement series on the disc.

As relay SL locks, contact SL2 operates relay M (FIG. 2D) thus permanently connecting the output of the amplifier to line at contact M1 (FIG. 2C). All announcements recorded on the disc are thus given. As a result an obviously contradictory and meaningless message will be heard. Since relay M (FIG. 2D) is permanently held, an announcement "That was a false message please ignore" is given as CS reaches position 43. Should relay SL (FIG. 2H) not have operated, relay M (FIG. 2D) will be unable to operate as CS reaches position 43. The "Synchronism Lost" announcement is, therefore, suppressed.

Relay SO (FIG. 2H) is operated on the 5 second "End of Cycle" pulse and relay HS thus releases. Relay SL releases as relay D (FIG. 2G) releases.

TRANSIENT START FAILURE. WIPER CONTACT 44

This part of the circuit is only applicable to incoming calls and a description of its operation is given later.

Figure 2H:
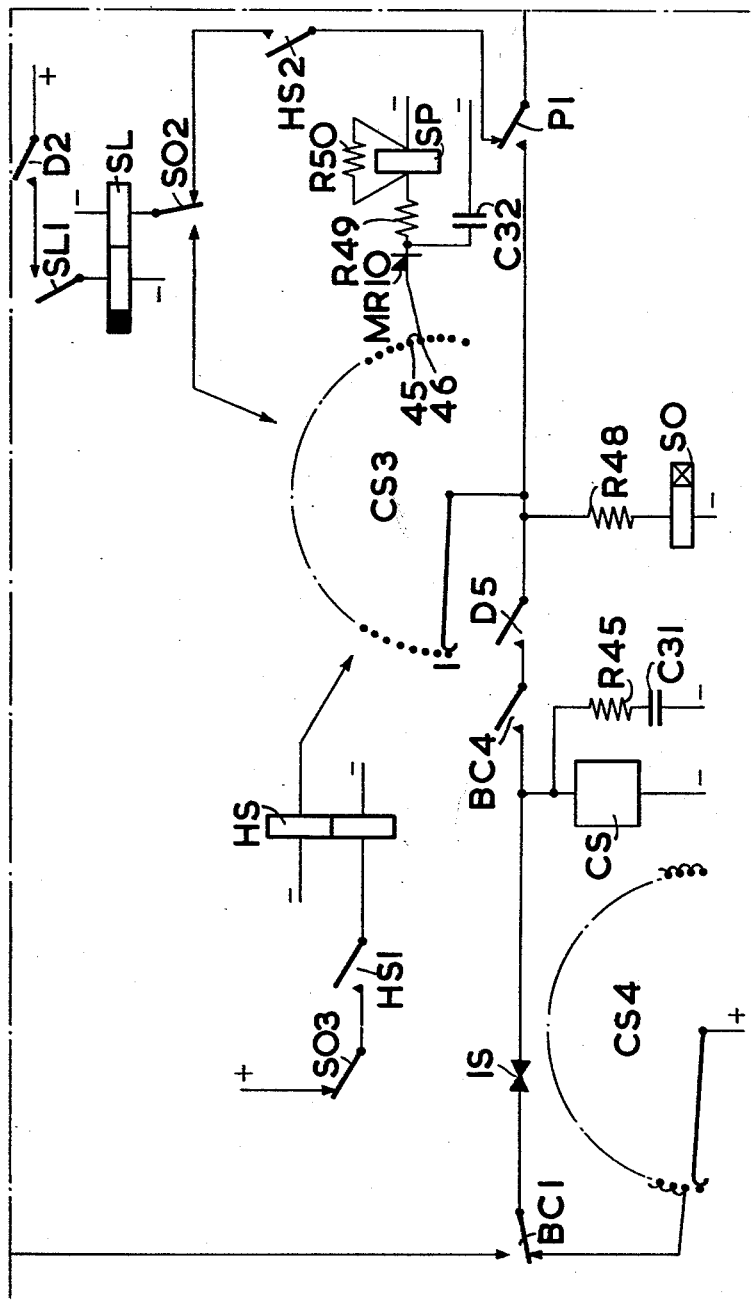
Figure 21:
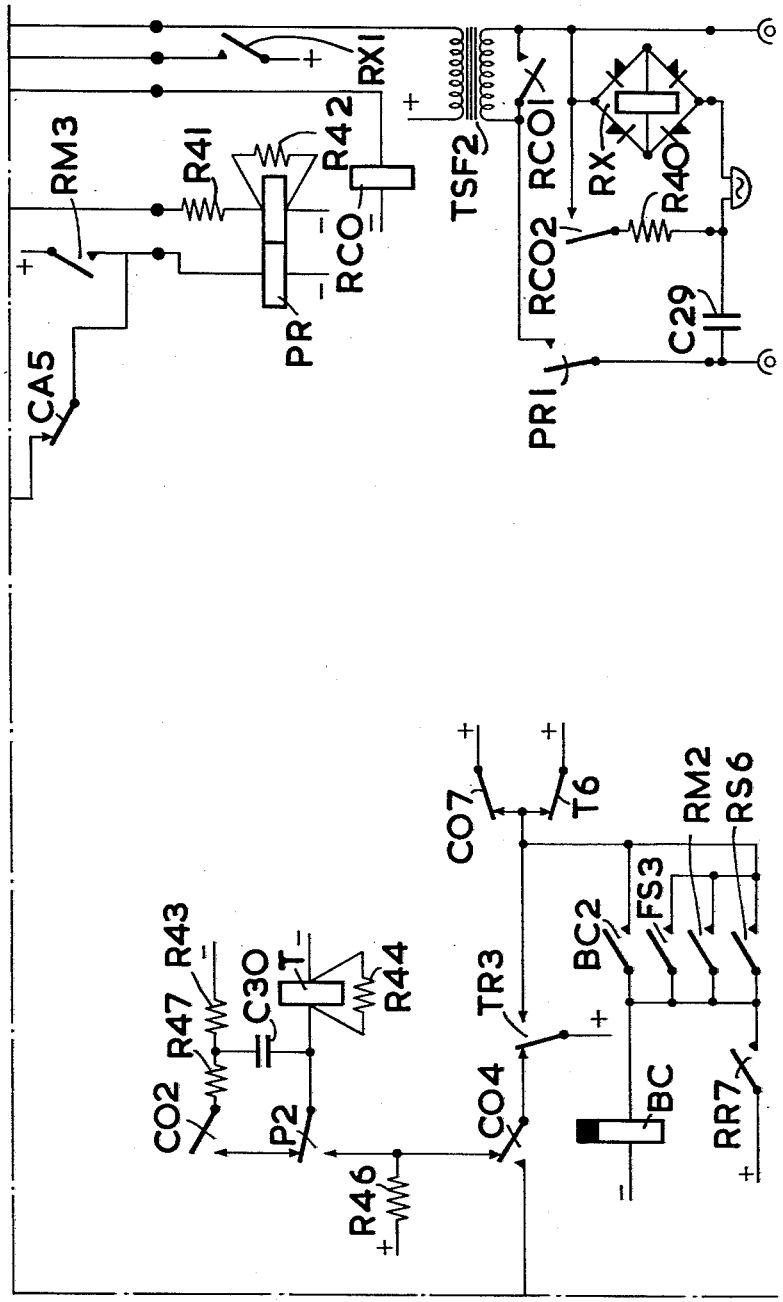

Selector CS is stepped to contact 44 and then to contact 45 by 150 milliseconds pulses given by contact P1 (FIG. 2H).

ACKNOWLEDGEMENT. WIPER CONTACTS 45 AND 46

As has been mentioned earlier, the equipment is designed so that it will make a number of attempts to contact the control room should its initial call be unsuccessful.

In order to prevent annoyance being caused to the control room and to eliminate unnecessary use of equipment, it is imperative that means be provided whereby the control room can advise the substation equipment that they have received the call correctly. The substation must then disengage itself from the telephone line and reset itself.

As selector CS steps to contact 45, relay M (FIG. 2D) will operate over contact 45 of CS1, contact RS8, contact 45 of CS2 and contact SL2. The amplifier output is connected to line at contact M1 (FIG. 2C) and the announcement "Send acknowledgment signal now" is heard.

Immediately following this announcement, contact P1 (FIG. 2H) pulses again, stepping selector CS to contact 46. Relay M (FIG. 2D) remains operated from bank CS2 over rectifier MR9 and contact SL2. Relay SP operated over contact 45 of CS3 as contact P1 closed to step the selector to position 46. The capacitor C32 (FIG. 2H) is thus charged over rectifier MR10 and can only discharge through the relay coil SP as rectifier MR10 prevents current flow back over bank CS3. Relay SP has a release delay of 5 seconds due to condenser C32 and resistors R49 and R50.

Relay TR (FIG. 2E) operates over bank CS1 (FIG. 2D), contact RS8, bank CS2, and contact SP1 (FIG. 2E). Its contact TR4 (FIG. 2C) connects the base of transistor Q5 to the line-matching transformer TSF2 (FIG. 2I) over the attenuator network R37 (FIG. 2A), C11, R22 and contacts SP3 (FIG. 2C) and M1. Contact TR2 (FIG. 2B) connects the output of transformer TSF3 to the emitter of transistor Q3 via condenser C9. As a result, any incoming tone signals will pass to the input of the amplifier, comprising transistors Q5 (FIG. 2A), Q6, Q7 (FIG. 2B), Q3, Q4 and Q8.

Contact TR3 (FIG. 2I) changes over and disconnects the direct operating circuit of relay T. This contact also provides an alternative holding circuit for relay BC. Relay T will now be slow to operate on the closure of P2 due to the presence of the limiting resistor R46.

The signal required for acknowledgment purposes is a continuous tone signal of between 2.5 seconds and 5 seconds. The frequency of the tone is unimportant provided it is between 300 cycles and 3 kilocycles. If the tone signal does not fulfil these timing requirements, the equipment does not shut itself down but continues in operation and will re-dial the control room after a delay. In this way the equipment is able to "recognise" when the control room number is engaged or unobtainable. Due to the timing requirements, the acknowledgment signal cannot be given falsely by dial, ringing, number unobtainable or engaged tone.

The limits on the timing are provided by relays SP (FIG. 2H) and T (FIG. 2I). As has been seen, relay SP (FIG. 2H) is operated as the selector is energised preparatory to stepping to position 46. The release delay due to the shunting capacitor C32 is 5 seconds. Relay T (FIG. 2I) is slow to operate when contact P2 closes due to the series resistor R46 and the shunt capacitor C30. The operating delay is 2.5 seconds.

The acknowledgment tone signal applied to the equipment from the telephone line is passed to the amplifier and to the rectifiers MR1 (FIG. 2B) and MR2 and the D.-C. amplifier controlling relay P. This relay will thus operate on any incoming signal for the period during which relay TR (FIG. 2E) holds the amplifier connected in this manner. As a result, contact P2 (FIG. 2I) will change over and relay T will start to operate. Should the tone signal be interrupted, even mementarily, relay P (FIG. 2B) will release and the capacitor C30 (FIG. 2I) will be discharged over contacts P2 and CO2 and the limiting resistor R47.

Provided that the tone signal is continuously applied for at least 2.5 seconds, relay T will operate. Relay SP (FIG. 2H) will release 2.5 seconds later and for acknowledgment to be effective the tone signal must have ceased before this relay releases. Four possible conditions thus exist.

(1) The tone signal may not be given.
(2) The duration of the tone signal may be less than 2.5 seconds.
(3) The duration of the tone signal may be more than 2.5 seconds, but less than 5 seconds.
(4) The duration of the tone signal may exceed 5 seconds.

In condition 1, relay P (FIG. 2B) will not operate and thus relay T (FIG. 2I) will not operate.

Condition 2 is effectively identical for although relay P operates it does not hold up long enough to allow relay T to operate. As a result, relay SP (FIG. 2H) will release after a delay of 5 seconds during which relay T (FIG. 2I) did not operate. Relay TR (FIG. 2E) is released by contact SP1, and contact SP3 (FIG. 2C) short-circuits the primary of the Post Office line transformer TSF2 (FIG. 2I). Contacts TR2 (FIG. 2B) and TR4 (FIG. 2C) reconnect the amplifier circuit so that its output is to line whilst contact TR3 (FIG. 2I) recompletes the circuit to step selector CS under the control of contact P1 (FIG. 2H). The equipment thus continues in operation when conditions 1 or 2 apply.

In conditions 3 and 4, relay T (FIG. 2I) will operate over contact P2 after a 2.5 second delay. Relay NU (FIG. 2F) operates over contacts SP2 and T1 and holds via contact NU1. Relay RS (FIG. 2E) holds over contacts TC5, RS5 and T2 whilst relay TR (FIG. 2E) locks over contacts TR1, T3, RS2 (FIG. 2F) and RR4. Relay BC (FIG. 2I) continues to hold over contacts BC2 and TR3.

In order to meet condition 3, the tone signal applied to the line will cease within 2.5 seconds after the operation of relay T. As a result, relay P (FIG. 2B) will release, in turn releasing relay T (FIG. 2I) over contacts P2 and CO2. Relay NU (FIG. 2F) continues to hold over contacts SP2 and NU1 but relay RS (FIG. 2E) releases as contact T2 opens. Relay TR continues to hold over contact SP1 and thus the amplifier input remains connected to line.

As relay RS releases, its holding circuit is broken at contact RS5. Relay M (FIG. 2D) releases as contact RS8 opens and thus the output of the amplifier is disconnected at contact M1 (FIG. 2C). Relay DPO (FIG.

2F) operates over contact NU3 as contact RS3 falls back and locks over contacts DPO1, RR2 and D1. Contact DPO2 opens, thus releasing PR (FIG. 2I) and, at contact PR1, breaking the Post Office exchange line.

As contact RS8 (FIG. 2D) opens, relay TR (FIG. 2E) will release and contacts TR2 (FIG. 2B) and TR4 (FIG. 2C) will reconnect the amplifier output to contact M1. Selector CS is brought under the control of contact P1 (FIG. 2H) as contact TR3 (FIG. 2I) falls back. Relay BC continues to hold over contacts BC2 and T6 At the end of the 5 second delay, relay SP (FIG. 2H) releases and relay NU (FIG. 2F) falls out as contact SP2 opens. Relay RS (FIG. 2E) is unable to re-operate as contact RS5 is open The selector will continue to step under the control of pulses from contact P1 (FIG. 2H) until the cycle is completed. This part of the sequence is described later.

The receipt of the correct tone signal thus causes the equipment to disconnect itself from the telephone line and release the exchange connection immediately.

In condition 4, relay T (FIG. 2I) would operate as described above but would still be held operated over contact P2 when relay SP (FIG. 2H) released. Relay TR (FIG. 2E) would be held over contacts CS2 and SP1 and also over contacts TR1 to RR4 (FIG. 2F).

As relay SP (FIG. 2H) releases, relay NU (FIG 2F) drops out when contact SP2 and the amplifier input is disconnected at SP3 (FIG. 2C). The tone signal which is still being applied to the amplifier from the telephone line circuit is thus removed and relay P (FIG. 2B) releases. Relay T (FIG. 2I) thus releases as the capacitor C30 is short-circuited over contacts P2 and CO2 and resistor R47 Relay NU (FIG. 2F) has already released and thus relay RS (FIG. 2E) continues to hold over contacts TC5, RS5 and NU2. The amplifier output is reconnected to the telephone line at contacts TR2 (FIG. 2B) and TR4 (FIG. 2C) as contact T3 (FIG. 2E) releases relay TR. Relay BC (FIG 2I) continues to hold as contact T6 falls back before contact TR3 Relay M (FIG. 2D) still holds over contacts CS1, RS8 and CS2 and rectifier MR9 and thus the next announcement will be passed to line.

A tone signal of too long a duration thus fails to shut the equipment down and the operating cycle continues.

REPEAT MESSAGE. WIPER CONTACTS 46 AND 47

Should the operator at the control room miss part of the message it is desirable to provide facilities whereby the equipment may be instructed by the control room to repeat the message. The repeated message should be given immediately without the necessity of the equipment disconnecting and re-engaging the telephone line and then re-dialling.

Immediately after the delay which allowed the cotnrol room to acknowledge receipt of the message, the announcement "Send repeat message signal now" is given.

If the "acknowledgment" circuits have been operated correctly, this announcement will not, of course, be heard as the equipment will have disconnected itself from the telephone line.

The repeat message signal required is identical with that used as an acknowledgment signal and consists of a continuous tone exceeding 2.5 seconds but not greater than 5 seconds. The four conditions applicable to the acknowledgment signal still apply as the timing is carried out in an identical manner by relays SP and T (FIGS. 2H and 2I).

Immediately the "repeat message" announcement is given, the selector CS is stepped to position 47 by contact P1 (FIG. 2H). As contact P1 closed to energize the selector coil CS preparatory to stepping to contact 47, relay SP operated and the shunt capacitor C32 was charged. This relay is thus slow to release.

As the selector CS steps to position 47, relay TR (FIG. 2E) holds over contacts CS1 (FIG. 2D), RS8 and CS2, rectifier MR11 and contact SP1 (FIG. 2E), whilst relay M (FIG. 2D) will be operated from this supply over rectifier MR9 and contact SL2. The input of the amplifier is thus connected to line by contacts M1 (FIG. 2C), TR4, SP3 and TR2 (FIG. 2B).

If the repeat message signal is not given or if it is of too short a duration the operation of the equipment is identical with that described under "Acknowledgment Signal."

Should the tone signal exceed 2.5 seconds, relay T (FIG. 2I) will operate over contact P2 and relay NU (FIG. 2F) will operate over contacts T1 and SP2. An alternative holding circuit is provided for relay TR (FIG. 2E) over contacts TR1, T3, RS2 (FIG. 2F) and RR4. Relay RM (FIG. 2E) operates from bank CS2 over contacts T4, SP4 and RS4, whilst relay BC (FIG. 2I) continues to hold over contacts BC2 and TR3.

Should the tone signal applied to the equipment from the telephone line cease within the next 2.5 seconds, relay T will release and the "Repeat message" signal will become effective. Relay NU (FIG. 2F) will continue to hold over contact NU1, and relay RS (FIG. 2E) will release as contact T2 falls back. Relay TR continues to hold over contact SP1 and the input of the amplifier remains connected at this stage to the telephone line.

Relay RM will remain operated over contact RM6 as contact RS4 falls back. This relay is slow to release in order to prevent its being released between the opening of contact T4 and the release of relay RS.

Contact RS3 (FIG. 2F) operates relay DPO over contact NU3 but relay PR (FIG. 2I) is held by contact RM3 and thus the exchange connection is not broken. Relay PFS (FIG. 2F) is held operated by contact RM4.

Contact RS8 (FIG. 2D) opens, thus releasing relay M and disconnecting the amplifier output as contact M1 (FIG. 2C) falls back.

The exchange connection is thus maintained and the equipment continues in operation to complete this cycle. The method by which the announcement is repeated will be considered later after the manner in which the equipment is reset at the completion of the cycle has been examined.

Should the tone signal applied to the equipment from the control room exceed 5 seconds, relay SP (FIG. 2H) will release whilst relay T (FIG. 2I) is operated. As a result, contact SP3 (FIG. 2C) will disconnect the input to the amplifier whilst contact SP2 (FIG. 2F) will release relay NU. Relay RM (FIG. 2E) is released as contact SP4 opens. As the input to the amplifier is removed at contact SP3 (FIG. 2C), the tone signal is interrupted and relay P (FIG. 2B) releases. Contact P2 (FIG. 2I) thus falls back releasing relay T. Relay NU (FIG. 2F) has already been released at contact SP2 and relay RS (FIG. 2E) will continue to hold over contact NU2. Relay TR is released at contact T3 and the amplifier output is thus re-connected to the exchange line. Relay BC (FIG. 2I) continues to hold over contacts BC2 and T6.

As a result of an incorrect signal having been given the equipment fails to accept the repeat message instruction and the cycle continues.

Immediately following the release of relay SP (FIG. 2H), three further 150 milliseconds pulses are given to step selector CS to position 50. This, of course, occurs under all conditions.

END OF CYCLE. WIPER POSITIONS 50 AND 1

Should the call have been acknowledged correctly, the equipment will have already disconnected itself from the Post Office line and it is then only necessary to release certain relays and stop the announcement unit as the selector CS steps to position 1. If a "Repeat Message" signal has been given it is necessary to keep the equipment in operation. If neither signal has been given, the equipment must disconnect itself from the exchange line, continue in operation and complete a second cycle. At the end of this second cycle, it must again engage the exchange line and re-dial the control room number.

Three separate conditions thus exist and will be considered in turn.

NORMAL SHUT DOWN

Under the condition in which the "Acknowledgment" signal has been given correctly, relay RS (FIG. 2E) will have been released.

The signal to step selector CS from position 50 to position 1 consists of a 5 second tone burst. Contact P1 (FIG. 2H) thus holds the magnet CS of the selector energised on position 50 and contact P2 (FIG. 2I) allows relay T to operate after a delay of approximately 2½ seconds.

As relay T operates, contact T6 opens and breaks the holding circuit for relay BC which thus releases. Relays CO (FIG. 2G) and D are, however, held operated by contact T5, whilst the supply to relay PR (FIG. 2I) remains broken at contact DPO2 (FIG. 2G).

As contact BC1 (FIG. 2H) falls back and contact BC4 opens, the homing circuit for selector CS is completed over the interrupter springs IS and bank CS4. The selector thus steps to position 1. If the selector and record have lost synchronism, this circuit arrangement ensures that CS returns to position 1 automatically at the end of the cycle.

The supply to relay BC (FIG. 2I) is broken at contact BC2 in order to prevent re-operation of this relay when contact T6 re-closes.

At the end of the 5 second tone signal from the disc, relay P (FIG. 2B) will release and contact P2 (FIG. 2I) will allow relay T to fall out. As contact T5 (FIG. 2G) falls back, the holding circuit for relays CO and D is broken and these relays release. Relay PR (FIG. 2I) cannot be re-operated when contact CO5 (FIG. 2G) falls back as contact BC7 is already open.

As relay D releases, contact D1 (FIG. 2F) opens and stops the announcement unit motor MTR (FIG. 2C) by releasing relay MS, in addition to releasing relays PFS (FIG. 2F) and DPO. Should relay SL (FIG. 2H) have operated earlier in the cycle, it will be released as contact D2 opens. Relay DPO (FIG. 2F) will be unable to re-operate relay PR (FIG. 2I) as contacts CO5 (FIG. 2G) and D7 are opened. The release of relay PFS (FIG. 2F) does not affect the operation of the circuit.

As a result, the equipment has been reset with the announcement unit stopped and selector CS standing at position 1.

"REPEAT MESSAGE"

Should the "Repeat Message" signal have been given correctly the equipment must be kept in operation with the exchange connection held and the dialling code suppressed. It will be recalled that relay RM (FIG. 2E) had operated and was holding relay PR (FIG. 2I) over contact RM3.

As relay P (FIG. 2B) operates on the 5 second signal, relay T (FIG. 2I) will operate as has been described above. Relay BC will thus release and the selector will run under its interrupter springs IS (FIG. 2H) to position 1.

Relay RM (FIG. 2E) will be held operated over contacts RS4 and RM6 and will thus be independent of relay T (FIG. 2I). At the end of the 5 second signal, relay P (FIG. 2B) will release thus allowing relay T (FIG. 2I) to fall out. Contact T5 (FIG. 2G), therefore falls back to release relays CO and D, and thus relay DPO (FIG. 2F) will be released.

As contact T6 (FIG. 2I) falls back, relay BC will immediately re-operate over contact RM2 and hold over contact BC2. Relay MS is re-operated and the announcement unit motor MTR (FIG. 2C) is thus restarted as contact BC3 (FIG. 2F) changes over, whilst contact BC6 (FIG. 2G) operates relay RCO (FIG. 2I) over contacts CO1 (FIG. 2G) and RR3.

On the first pulse of the dialling code, relay T (FIG. 2I) will operate over contacts TR3, CO4 and P2 and will hold up over dialling due to the delay condenser C30. Relay D (FIG. 2G) operates over contact T5, and contact D1 (FIG. 2F) provides an alternative operating circuit for relay MS (FIG. 2C).

Relay RS (FIG. 2E) is operated as contact D3 closes. Relay D (FIG. 2G) holds over contacts D7 and BC6. Relay RM (FIG. 2E) continues to hold over contacts CO6 and RM6.

At the end of the dialling train, relay T (FIG. 2I) will release and relay CO (FIG. 2G) will operate over contacts T5, D7 and BC6. Contact T6 (FIG. 2I) provides an alternative holding circuit for relay BC. As relay CO (FIG. 2G) operates, relay RCO (FIG. 2I) is released as contact CO1 (FIG. 2G) changes over and an alternative holding circuit is provided for relays CO and PR (FIG. 2I). The operating circuit for relay RS (FIG. 2E) is broken as contact CO3 (FIG. 2F) changes over but this relay continues to hold over contacts RS5 and NU2. The selector is brought under the control of contact P1 (FIG. 2H) as contact CO4 (FIG. 2I) changes over, whilst contact CO6 (FIG. 2E) breaks the holding circuit from relay RM which thus releases.

The opening of contact RM3 (FIG. 2I) does not release relay PR as several alternative holding circuits are available over contact DPO2 (FIG. 2G). Relay PFS (FIG. 2F) stays operated as contact RS3 closes before contact RM4 opens.

The equipment has thus been held in operation and an announcement as to the identity of the substation will be heard as relay M (FIG. 2D) operates in the manner described earlier. The equipment will thus execute a second complete cycle and will disconnect itself from the exchange lines should the correct acknowledgment signal be given towards the end of the cycle.

"ACKNOWLEDGMENT" AND "REPEAT MESSAGE" SIGNALS NOT GIVEN

Should the equipment be unable to make contact with the control room due to the number being either unobtainable or engaged, or should the control room fail to give an "Acknowledgment" or "Repeat Message" signal, the equipment must disengage itself from the telephone line. It is desirable that it should still continue in operation, however, and carry out one complete cycle without the exchange connection being engaged. This serves as a delay period in order to allow the control room number to become disengaged. At the end of this second cycle, the exchange connection has to be re-engaged and a further complete cycle executed. This sequence conveniently continues until four unacknowledged calls have been made, after which it must reset and disconnect itself from the exchange line.

Under these conditions, the selector will step to position 50 with relay RS (FIG. 2E) still operated. Relay S will, therefore, operate over contacts CS1 (FIG. 2D), RS8, CS2 and CA4 (FIG. 2E). As relay RS is still operated, relay CA will be unable to operate when contact S1 closes due to its coil being effectively short-circuited.

As the selector is energised to step from position 50 to position 1, the cycle of operations described immediately above will take place. Relay T (FIG. 2I) will operate on the 5 second "End of Cycle" tone and relay BC will release. The selector will step to position 1 over its interrupters IS (FIG. 2H), bank CS4 and contact BC1. Relays CO (FIG. 2G) and D release as relay T (FIG. 2I) falls back and relay BC then re-operates over contacts RS6 and T6 and holds over contact BC2.

As selector CS steps clear of position 50, relay CA (FIG. 2E) operates in series with relay S over contacts RR4 (FIG. 2F), RS2, CB coil, CB2 (FIG. 2E), CA3, S1 and CA4. Relay CA holds at contact CA1 (which closes before any other CA contacts change over) over limiting resistor R51 and contact CA3 switches bank CS2 through to relay CB (FIG. 2F). Relay S (FIG. 2E) is differentially connected and the changeover of contact CA4 causes a reversal of flux in the coil. This causes the relay S to release and break its holding circuit at contact S1. This prevents relay CB (FIG. 2F) from operating in series with relay S (FIG. 2E) at this stage. It is to be noted that contacts CB1 and CC1 operate before the other contacts of the respective relays CB and CC change over.

SECOND CYCLE

The supplies to relay PR (FIG. 2I) are broken at contacts CA5 and CA2 (FIG. 2G) and the equipment is thus unable to operate relay PR (FIG. 2I) and re-engage the exchange line. It is, however, still fully operational and a normal cycle will be carried out on the re-operation of relay BC. Contact P3 (FIG. 2G) will be unable to pass dialling pulses to relay PR (FIG. 2I). A delay period equal in length to one complete cycle, therefore takes place. Since no acknowledgment signal can be given on this cycle, selector CS will reach position 50 with relay RS (FIG. 2E) still operated. Should this "dummy" delay period not be required, the control room number will be immediately redialled if contacts CA5 (FIG. 2I) and CA2 (FIG. 2G) are made ineffective by being shorted out permanently.

THIRD CYCLE

A selector CS steps to position 50, relay S (FIG. 2E) will operate over contacts CS1 and CA4. Relay T (FIG. 2I) will operate after a 2.5 second delay and release relay BC. The selector thus steps to position 1. At the end of the 5 second pulse, relay T releases and relays CO (FIG. 2G) and D fall out.

Relay CB (FIG. 2F) will operate in series with relay S (FIG. 2E) over contacts CC2 (FIG. 2F), CB3, CA3 (FIG. 2E), S1 and CA4 as selector CS steps to position 1. Relay CB (FIG. 2F) will hold over contact CB1 and limiting resistor R52, and contact CB2 (FIG. 2E) will change over. As a result, the differentially connected relay CA will release and its holding circuit will be broken at contact CA1. Relay S is disconnected at contact CA3 and contact CA4 acts as described earlier. Relay S therefore releases.

Relay RS is still operated and, as a result, relay BC (FIG. 2I) will re-operate as contact T6 falls back. The equipment will thus continue in operation but with relay CA (FIG. 2E) released. The telephone exchange line will be re-engaged when relay BC (FIG. 2I) operates and the equipment will dial out again. It thus makes a second attempt to contact the control room as it carries out a third cycle.

Should it still not receive an acknowledgment signal, selector CS will reach position 50 with relay RS (FIG. 2E) still operated. Relay S will again operate but relay CA is shorted out at this stage. The normal "end of cycle" operation described above is carried out and relay CA operates in series with relay S as selector CS steps to position 1. Relay S is released by contact CA4 and relay CA holds over contact CA1.

FOURTH CYCLE

The circuits to relay PR (FIG. 2I) are broken at contacts CA5 and CA2 (FIG. 2G) and the equipment will thus be unable to re-engage the telephone line. A further complete cycle takes place on the re-operation of relay BC (FIG. 2I) and this cycle, the fourth, acts as the second delay period.

Since the equipment is disconnected from the exchange line, no "acknowledgment" signal will be given and selector CS will reach position 50 with relay RS (FIG. 2E) still operated.

As a result, relay S will operate from bank CS2 and relay T (FIG. 2I) will carry out the "end of cycle" operation described earlier. Relay BC will release and selector CS will step from position 50 to position 1. Relays D (FIG. 2G) and CO will be released.

As selector CS steps clear of position 50, relay CC (FIG. 2F) will operate over contacts RR4, RS2, CC3, CB3, CA3 (FIG. 2E), S1, CA4 and the coil of relay S. The relay CC will hold at contact CC1 and limiting resistor R53, and the differentially connected relay CB will release as contact CC2 changes over. The holding circuit of relay CB is broken at contact CB1 and contact CB3 opens. As relay CB releases, contact CB2 (FIG. 2E) releases the differentially connected relay CA which breaks its holding circuit at contact CA1. Contact CA4 releases relay S.

As a result, all relays in the counting chain, with the exception of relay CC (FIG. 2F), are released.

FIFTH CYCLE

Relay BC (FIG. 2I) will re-operate over contacts RS6 and T6 as relay T falls back at the conclusion of the "end of cycle" pulse. The equipment thus continues in operation in the manner described above and the circuits to relay PR are completed over the released contacts CA5 and CA2 (FIG. 2G). As a result, the equipment will make a third attempt to contact the control room as it carries out this fifth cycle.

Should it still not receive an acknowledgment signal, selector CS will reach position 50 with relay RS (FIG. 2E) still operated. As a result, relay S will operate again and the normal "end of cycle" operation takes place. Relay CA will operate in series with relay S as selector CS steps to position 1. Relay CA holds at contact CA1 and releases relay S at contact CA4. The telephone line circuits are disengaged at CA2 (FIG. 2G) and CA5 (FIG. 2I).

SIXTH CYCLE

As relay T falls back, relay BC re-operates and the equipment commences a sixth cycle of operations with relays CA (FIG. 2E) and CC (FIG. 2F) in the counting chain operated. This sixth cycle will thus act as a third pause cycle during which the equipment will be unable to engage an exchange line.

At the end of this cycle, selector CS will again reach position 50 and will re-operate relay S (FIG. 2E). The normal "end of cycle" operation takes place as selector CS steps to position 1.

As it does so, relay CB (FIG. 2F) operates in series with relay S (FIG. 2E) and holds at contact CB1 (FIG. 2F). As contact CB2 (FIG. 2E) changes over, relay CA releases, thus releasing relay S. The telephone line circuits are thus restored at contacts CA2 (FIG. 2G) and CA5 (FIG. 2I).

SEVENTH CYCLE

As relay T falls back, relay BC will again re-operate and the exchange line will be re-engaged as relay PR operates. As a result, the equipment will carry out a seventh cycle of operations during which it will attempt, for a fourth time, to make contact with the control room. Relays CB (FIG. 2F) and CC in the counting chain are operated.

Should it still not receive an acknowledgment signal during this cycle, it is required that the equipment disengage itself from the line and cease to make any further attempts to dial out until a further "transient start" occurs due to a change in state of one of the circuit breakers.

Should it be unsuccessful in establishing contact with the control room, bank CS2 will again re-operate relay S (FIG. 2E) on position 50 and relay T (FIG. 2I) will release relay BC. Selector CS therefore steps to position 1 and relay CA (FIG. 2E) operates in series with relay S. Relay CA holds over contact CA1 and releases relay S at contact CA4. As S1 falls back positive is applied over contacts RR4 (FIG. 2F) and RS2, limiting resistor R55 (FIG. 2E), and contacts S1, CA3, CB3 (FIG. 2F) and CC3 to operate the full count relay FC.

Relays CO (FIG. 2G) and D will have released as relay T (FIG. 2I) fell back at the termination of the "end of cycle" signal. Relay RS (FIG. 2E) is short-circuited by contact FC2 and is, therefore, slow to release. On its ultimate release, the counting chain relays are released as contact RS2 (FIG. 2F) falls back. Relay FC thus also releases. Relay PFS was released as contact RS3 opened whilst contact RS5 (FIG. 2E) breaks the holding circuit for relay RS. Relay BC (FIG. 2I) will be unable to re-operate at the termination of the "end of cycle" signal as contact RS6 will be open. Any subsequent operations of relay M (FIG. 2D) are prevented as contact RS8 is open.

As a result, all relays in the equipment have been released and the announcement unit motor has been stopped.

Should the "acknowledgment" signal have been given during either the first, third, fifth or seventh cycle the equipment would have disconnected itself from the line in a manner described earlier. Any relays in the counting chain that had been operated would have been released as contact RS2 (FIG. 2F) opened.

TRANSIENT START OCCURRING DURING CYCLE

Should a circuit breaker change state whilst a message is being given, it is essential that the control room number be re-dialled immediately the cycle has ended and thus detail the revised positions of the breakers. Should this situation occur, relay FS will operate over contact TS1, rectifier MR5 and contact FC5 and will lock over contacts FS1 and CO3.

When the call is acknowledged correctly, the equipment will disconnect itself from the line in the normal manner and relays RS (FIG. 2E), CO (FIG. 2G), D and BC (FIG. 2I) will release with selector CS standing on position 1. As relay T falls back, relay BC will re-operate over contact FS3 and thus set the equipment in operation again. Relay FS (FIG. 2F) will remain operated until relay BC (FIG. 2I) re-operates after which it will release. The equipment will thus have been set in motion again and the control room number will immediately be re-dialled. The normal "acknowledgment" and "repeat message" circuits remain fully operational on this call.

TRANSIENT START LOCKED

The possibility arises whereby a failure of the internal or external "Transient Start" equipment may result in a permanent start being applied to the equipment.

As a result, relay FS (FIG. 2F) will be held operated over rectifier MR5 and contact FC5 from either the external transient start terminals TST or from contact TS1. The equipment is thus set in operation and dials the number of the control room. Despite the fact that the call may be acknowledged correctly and relay RS (FIG. 2E) released, relay FS (FIG. 2F) will remain locked. As a result, relay BC (FIG. 2I) will be re-operated and a further call to the control room will be put through. It must be noted that should the "acknowledgement" signal be given, no delay period will elapse between calls as the counting chain will be unable to operate owing to contact RS8 (FIG. 2D) being open.

This permanent start given by relay FS (FIG. 2F) thus causes the equipment to continue in its efforts to make contact with the control room and the cycle of operations will be carried on until four successive calls have been put through to the control room without any "acknowledgment" signal being given.

All relays in the counting chain are thus operated and relay FC therefore operates. This relay locks on its second winding to the external transient start terminals TST or contact TS1 over contact FC5.

All other relays in the system are released in the manner described above for operation of the full count circuit. Relay FC will continue to be held operated and it is thus impossible for any further outgoing calls to be made by the system until the fault has been repaired. Incoming calls will, however, proceed quite normally and an announcement "Transient Start has failed" will be given every time selector CS steps to position 44. Contact FC3 (FIG. 2D) provides the operating circuit for relay M as contact RS8 is unable to operate at any stage due to the short circuit at contact FC2 (FIG. 2E) of its operating relay RS. Contact D8 (FIG. 2D) prevents relay M from operating except during a cycle in order to minimise battery drain. The peramnent positive applied from the external circuit over rectifier MR12 and the limiting resistor R60 to the bank CS1 of the selector results in the operation of relay M at this point and the release of the necessary announcement.

RINGING IN. LOCAL TELEPHONE NOT USED

Should a person at the control room or any outside telephone wish to obtain information as to the state of the equipment being monitored, the exchange number of the substation will be dialled. This will result in ringing current being applied to the exchange line terminals of the equipment and the operation of the ringing relay RX (FIG. 2I). Contact RX1 closes and operates relay RR (FIG. 2G) in the equipment.

Relay BC (FIG. 2I) is operated by contact RR7 and holds over contacts BC2 and CO7. The dialling circuit for relay PR is broken at contact RR8 (FIG. 2G) and the equipment is thus unable to pass a dialling code out to line. As relay BC (FIG. 2I) operates, contact BC3 (FIG. 2F) operates relay MS which starts the announcement unit motor MTR (FIG. 2C) and also operates relay FR (FIG. 2G) over contact RR1. Relay FR holds over contact FR2, and its contact FR3 completes an alternative holding circuit for its second winding. Contact FR1 (FIG. 2F) closes and thus provides a holding circuit for relay FS should it pulse due to a transient start occurring during the cycle.

The equipment is thus set in motion and the normal dialling procedure described earlier will be carried out, although the circuit to PR is broken at RR8. At the end of the dialling train, contact T5 (FIG. 2G) will fall back and operate relay PR (FIG. 2I) over contacts BC6 (FIG. 2G), D7 and T5, rectifier MR8, and contacts TC2, DPO2 and CA5 (FIG. 2I). Contact PR1 thus closes and trips the exchange ringing equipment.

Relay RS (FIG. 2E), which was operated as contact D3 closed, completes the circuit for the operation of relay M (FIG. 2D) at contact RS8.

Contact RR5 provides a signal by which the operation of the transient start circuits can be tested on an incoming call. This contact, in conjunction with its associated resistor/capacitor network R54, C33 produces a pulse across the primary of transformer TSF1 and thus operates relay TS momentarily. Relay TS operates relay FS (FIG. 2F) which thus locks over contacts FS1 and FR1. Relay PFS will operate from contacts BC3, FC4 and PFS2 and thus remove the positive voltage from contact 44 of bank CS1. Should the transient start circuit have failed, relay PFS will not operate and a positive voltage will be applied to contact 44 of CS1 over contacts RS3 and PFS3 and the limiting resistor R60. The "failure" announcement would thus be given during the cycle.

As contact CO1 (FIG. 2G) changes over, relay RCO is released. Relay RX (FIG. 2I) will have been released as the ringing current from the exchange equipment ceased. Relay RR (FIG. 2G) will, therefore, release.

The equipment has thus been set in motion from an outside call and will proceed to carry out a normal series of operations. Should the call not be acknowledged, the exchange line will be disconnected in the normal way and, after a delay equivalent to one cycle, the control room number will be re-dialled.

INCOMING CALL. LOCAL TELEPHONE USED

The condition might arise whereby a maintenance engineer in the substation may wish to use the associated telephone on an incoming call. It, therefore, becomes essential that means be provided whereby the equipment can be silenced and made to shut itself down by automatically "acknowledging" itself.

An external push button KTC is provided for this purpose and provided this is operated before relay RR releases, relay TC will operate and lock over contacts TC1 and BC6. Should the exchange ringing current have been tripped before the button is pressed, contact RR4 will have fallen back and relay TC cannot be operated. Correct operation of this push button causes contact TC1 to lock relay TC over contact BC6 and to disconnect relay PR (FIG. 2I) at contacts TC2 (FIG. 2G) and TC4. The equipment is thus disconnected from the exchange line.

Relay RS (FIG. 2E) is unable to operate as contact TC5 opens. As a result, relay M (FIG. 2D) is prevented from operating.

At the end of the cycle, relay BC (FIG. 2I) will be released as contact T6 opens but will be unable to re-operate as contact RS6 is back. As a result, the equipment will come to rest with the selector at position 1. Relay TC (FIG. 2G) will release as contact BC6 falls back.

INCOMING CALL DURING DELAY CYCLE

Should the exchange number of the equipment be dialled when it is carrying out the second, fourth or sixth cycle described above, the caller is connected immediately on to the equipment and hears the remainder of the message.

Under this condition, relay RR will operate as contact RX1 closes. Relay BC (FIG. 2I) continues to hold over contact BC2 to either contact T6 or TR3, and contact RR4 (FIG. 2F) releases the relays in the counting chain, including CA. As a result, relay PR (FIG. 2I) is operated over contact CA5 and the exchange line is connected to the equipment at contact PR1. Thus the caller hears the remainder of the cycle.

Should the external push button KTC (FIG. 2G) be operated, relay TC will silence the equipment in the manner described earlier as contacts TC2 and TC4 open. The counting chain will, however, have been released as contact RR4 (FIG. 2F) opens. The equipment thus automatically shuts itself down.

I claim:

1. In a supervisory apparatus for electrically transmitting different predetermined sounds in message form from a first station to a second station wherein said sounds represent different states of a condition under supervision, a single recorded medium upon which are recorded a plurality of discrete sounds in message form individually representing a plurality of the different possible variations of the conditions selected for supervision, means having an electrical output at said first station and including a reproducing device operatively connected to said recording medium to consecutively sense and convert said recorded sounds into electrical signals, a transmitting circuit connected to said output for transmitting said electrical signals from said first station to said second station, means for determining the status of the condition under supervision, and means under the control of said determining means to transitorily disconnect said transmitting circuit from said output whenever the converted recorded sounds fail to correspond to the determined status of said condition thereby preventing the transmission of those electrical signals which fail to represent the status of said condition.

2. An automatic telephone supervisory apparatus for transmitting different mesages relating to different predetermined conditions of a system from a calling station to an associated station having a predetermined code number over a telephone line passing through a telephone exchange, said supervisory apparatus comprising: a single recorded medium upon which are recorded a plurality of sounds in message and signal form individually representing a plurality of different possible variations of the conditions selected for supervision, a first means having an electrical output at said call station and including a reproducing device operatively connected to said recorded medium to consecutively sense and convert the recorded sounds into electrical signals with said output being adapted to be connected to said telephone line to permit the transmission of said electrical signals from said call station to said associated station, second means for checking and determining the status of the condition under supervision, third means under the control of said second means to transistorily disconnect said output from said telephone line whenever a converted electrical signal fails to correspond to the status of said condition as determined by said second means, code signals impressed on said recorded medium and representative of a dialling code number for said associated station and preceding the recorded sounds representing the different states of said condition under supervision, said code signals being sensed and generated by said reproducing device as electrical pulses and fourth means responsive to the generation of said pulses to connect said output to said telephone line for enabling the transmission of said pulses to said telephone exchange whereby the telephone exchange is actuated to establish a connection between said call station and said associated station for enabling the transmittal of said recorded sounds.

3. The supervisory apparatus as defined in claim 2 comprising means at said call station for requesting an acknowledgment signal from said associated station after the transmission of said recorded sounds is completed, means operable in response to the receipt of said acknowledgment signal to disconnect said output from said telephone line, and means operable in response to the absence of said acknowledgment signal to cause a recall of said associated station through said telephone exchange after a predetermined time delay to facilitate the re-transmission of said recorded sounds.

4. The supervisory apparatus as defined in claim 3 comprising means to repeat the recall of the associated station and the retransmission of reproduced signals a predetermined number of times.

5. The supervisory apparatus as defined in claim 3 comprising means at the call station for requesting a repeat message signal from the associated station on the conclusion of a complete transmission of said reproduced signals and means operable in response to the receipt of said repeat message signal to cause a retransmission of said reproduced signals to take place.

6. The supervisory apparatus as defined in claim 3 wherein said first means comprises a transistor amplifier providing said output and having an input electrically connected to said reproducing device but being operable to amplify signals passing in either direction between said calling station and said associated station.

7. In an automatic telephone supervisory apparatus for transmitting a message relating to the status of a plurality of circuit breakers from a calling station to an associated station having a given dialling code number over a telephone line passing through an exchange, said supervisory apparatus comprising: a single recorded medium upon which are recorded a plurality of sounds in message form individually representing the different possible states of said circuit breakers, first means having an electrical output at said call station and including a converting device for consecutively sensing and reproducing all of the recorded sounds into electrical signals, second means for connecting said output to said telephone and to actuate said exchange for establishing a connection with said associated station, third means for successively determining the status of circuit breakers, fourth means under the control of said third means to transitorily disconnect said output from said telephone line whenever an electrical signal generated by said reproducing device fails to correspond with the status of a circuit breaker as determined by said third means to prevent the transmission of only those messages which fail to correspond to the status of the circuit breakers.

8. The supervisory apparatus as defined in claim 7 wherein said second means comprises a change-over contact associated with each of said circuit breakers and arranged to correspondingly make and break with the operation of its associated circuit breaker, a condenser electrically connected to each of said change-over contacts such that upon operation of said contacts, the condenser associated therewith is caused to charge or discharge to produce a pulse of positive or negative sense, an amplifier circuit electrically connected to receive said pulse and being operable in the presence of said pulse of either sense to automatically call said associated station through said telephone exchange and thereby permit the selection and transmission of said electrical signals.

References Cited in the file of this patent
UNITED STATES PATENTS

| | | |
|---|---|---|
| 2,399,229 | Jacobson | Apr. 30, 1946 |
| 2,804,501 | Hart | Aug. 27, 1957 |
| 2,827,515 | Zuber | Mar. 15, 1958 |
| 2,847,507 | Stradley | Aug. 12, 1958 |
| 2,905,762 | Rettie et al. | Sept. 22, 1959 |